(12) United States Patent
Smeets (10) Patent No.: US 9,846,773 B2
(45) Date of Patent: Dec. 19, 2017

(54) TECHNIQUE FOR ENABLING A CLIENT TO PROVIDE A SERVER ENTITY

(71) Applicant: Telefonaktiebolaget L M Ericsson (publ), Stockholm (SE)

(72) Inventor: Bernard Smeets, Dalby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/653,346

(22) PCT Filed: Dec. 20, 2012

(86) PCT No.: PCT/EP2012/076394
§ 371 (c)(1),
(2) Date: Jun. 18, 2015

(87) PCT Pub. No.: WO2014/094857
PCT Pub. Date: Jun. 26, 2014

(65) Prior Publication Data
US 2015/0332044 A1 Nov. 19, 2015

(51) Int. Cl.
*H04L 9/32* (2006.01)
*G06F 21/53* (2013.01)
(Continued)

(52) U.S. Cl.
CPC .............. *G06F 21/53* (2013.01); *G06F 21/57* (2013.01); *H04L 63/0823* (2013.01); *H04L 63/20* (2013.01); *G06F 2221/034* (2013.01)

(58) Field of Classification Search
CPC .... G06F 21/53; G06F 21/57; G06F 2221/034; H04L 63/0823; H04L 63/20
See application file for complete search history.

(56) References Cited

U.S. PATENT DOCUMENTS 6,715,082 B1 * 3/2004 Chang ..................... G06F 21/34
713/160
7,752,450 B1 * 7/2010 Palmer .................... G06F 21/31
713/183
(Continued)

FOREIGN PATENT DOCUMENTS

| GB | 2487049 A | 7/2012 |
| WO | 2008070857 A1 | 6/2008 |
| WO | 2011139135 A1 | 11/2011 |

OTHER PUBLICATIONS

Neuman, C., et al., "The Kerberos Network Authentication Service (V5)", Network Working Group Request for Comments: 4120, Jul. 1, 2005, pp. 1-138, The Internet Society.
(Continued)

*Primary Examiner* — Sharon Lynch
(74) *Attorney, Agent, or Firm* — Patent Portfolio Builders, PLLC (57) ABSTRACT

A technique for enabling a client to provide a server entity is disclosed. In method aspects, a first method is performed in the client and comprises the steps of providing the client with a secure trusted environment, the environment being trusted by the client and by at least one third party, and accommodating, in the secure trusted environment, at least a local portion of the server entity, the server entity being configured to handle one or more server requests from the client, and data required by the server entity so as to handle the server request. A second method is performed in a server and comprises the steps of providing, for the secure trusted environment of the client, the environment being trusted by the client and by the at least one third party the at least local portion of the server entity, and the data.

16 Claims, 6 Drawing Sheets

(51) Int. Cl.
  *G06F 21/57* (2013.01)
  *H04L 29/06* (2006.01)

(56) References Cited

U.S. PATENT DOCUMENTS

| | | | | |
|---|---|---|---|---|
| 7,882,538 | B1* | 2/2011 | Palmer | G06F 21/31 713/150 |
| 8,185,933 | B1* | 5/2012 | Palmer | G06F 21/31 713/150 |
| 8,225,102 | B1* | 7/2012 | Palmer | G06F 21/31 340/5.54 |
| 9,325,698 | B2* | 4/2016 | Lovmand | H04L 63/0823 |
| 2004/0122910 | A1* | 6/2004 | Douglass | G06F 17/30902 709/214 |
| 2005/0193204 | A1* | 9/2005 | Engberg | H04L 9/3247 713/175 |
| 2005/0246766 | A1* | 11/2005 | Kirkup | H04L 63/0823 726/6 |
| 2006/0206720 | A1* | 9/2006 | Harada | H04L 63/02 713/182 |
| 2008/0005034 | A1* | 1/2008 | Kravitz | G06F 21/10 705/59 |
| 2008/0046758 | A1* | 2/2008 | Cha | G06F 21/57 713/189 |
| 2008/0133907 | A1* | 6/2008 | Parkinson | H04L 63/0823 713/158 |
| 2008/0148046 | A1* | 6/2008 | Glancey | G06F 21/33 713/156 |
| 2008/0155262 | A1* | 6/2008 | Beaver | H04L 9/3263 713/173 |
| 2008/0183851 | A1* | 7/2008 | Puthupparambil | H04L 63/0823 709/223 |
| 2010/0186062 | A1 | 7/2010 | Banti et al. | |
| 2010/0235912 | A1* | 9/2010 | Hermann | G06F 21/57 726/23 |
| 2011/0154017 | A1 | 6/2011 | Endstrom et al. | |
| 2011/0161663 | A1* | 6/2011 | Nakhjiri | H04L 63/0823 713/158 |
| 2011/0191859 | A1* | 8/2011 | Naslund | G06F 21/10 726/27 |
| 2012/0266209 | A1* | 10/2012 | Gooding | H04L 63/20 726/1 |
| 2013/0290705 | A1* | 10/2013 | Lovmand | H04L 63/0823 713/156 |
| 2014/0236842 | A1* | 8/2014 | Salminen | G06Q 20/20 705/75 |
| 2015/0222604 | A1* | 8/2015 | Ylonen | H04L 63/062 713/171 |
| 2017/0163689 | A1* | 6/2017 | Ylonen | H04L 63/20 |
| 2017/0171175 | A1* | 6/2017 | Ylonen | H04L 63/062 |

OTHER PUBLICATIONS

Myers, M., et al., "X.509 Internet Public Key Infrastructure Online Certificate Status Protocol—OCSP", Network Working Group Request for Comments: 2560, Jun. 1, 1999, pp. 1-23, The Internet Society.

Hardjono, T., "User-Managed Access (UMA) Profile", Network Working Group Internet-Draft, Mar. 29, 2012, pp. 1-48, version 4, IETF.

Muñoz-Tapia, J. et al., "CPC-OCSP: an Adaptation of OCSP for m-Commerce", Security in e-Commerce, Upgrade, Dec. 1, 2002, pp. 22-26, vol. III, No. 6, Novatica.

Berbecaru, D., "MBS-OCSP: An OCSP based certificate revocation system for wireless environments", 4th IEEE International Symposium on Signal Processing and Information Technology, Dec. 18, 2004, pp. 267-272, IEEE.

Hard, D., "The OAuth 2.0 Authorization Framework draft-ietf-oauth-v2-31", OAuth Working Group internet-draft, Jul. 31, 2012, pp. 1-49, obtained on Jun. 12, 2015, obtained from internet: http://tools.ietf.org/html/draft-ietf-oauth-v2-31.

Hardjono, T., "User-Managed Access (UMA) Profile", Network Working Group Internet-Draft, Oct. 1, 2012, pp. 1-51, version 5, IETF.

* cited by examiner

TECHNIQUE FOR ENABLING A CLIENT TO PROVIDE A SERVER ENTITY

TECHNICAL FIELD

The present disclosure generally relates to enabling a client to provide a server entity. The disclosure also relates to a client and a server for implementing the technique.

BACKGROUND

Plural security protocols have been put into service, in which two (or more) communicating parties involve either directly, in the protocol messaging, or in their setup a trusted third party that both parties have a trust relation with. The most prominent class of protocols resides in secure communication protocols like Secure Shell/Transport Layer Security (SSL/TLS), Datagram TLS (DTLS), Wireless TLS (WTLS), and Internet Protocol Secure (IPSec) when using digital certificates.

In those protocols, a Certificate Authority (CA) that signs the certificates, may be the trusted third party and the (self-signed) certificate of the CA may be used (trusted) by the communicating parties to verify the correctness of the certificates used in the protocol. Other examples, where such a setup is applied, is the Kerberos protocol or the UMA implementation of the OAuth2.o protocol.

Figure 1:
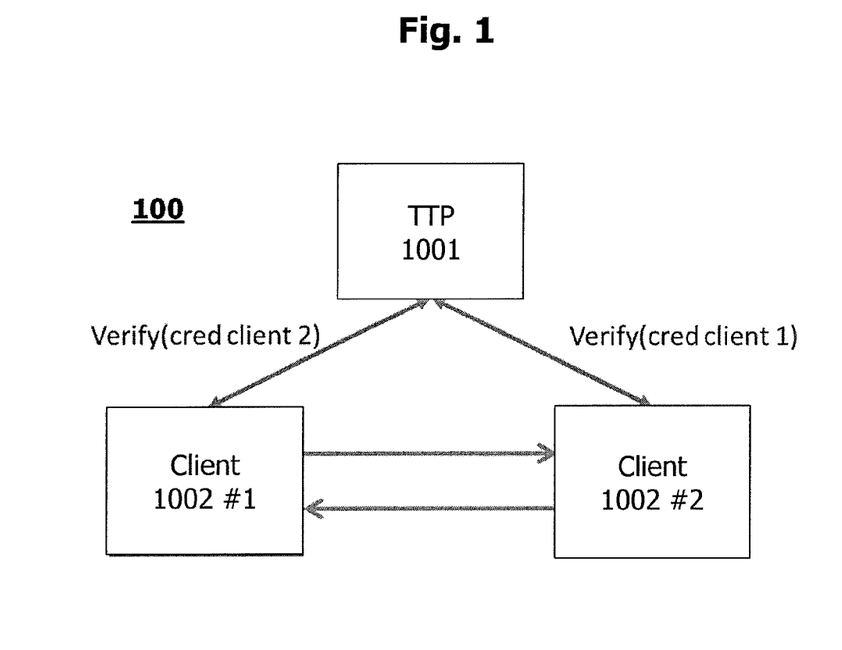
FIG. 1 shows a principle underlying the prior art.

FIG. 1 shows a principle underlying the prior art, and shows a network 100 comprising a Trusted Third Party (TTP) 1001 and at least two clients 1002.

Those protocols are considered, in which the knowledge and involvement of the TTP 1001 concerning the security protocol implies that the TTP 1001 issues information that the data (such as keys or credentials) used in the protocol is still to be trusted by the parties for its purpose.

FIG. 1 involves a Public Key Infrastructure (PKI), which means that the TTP 1001 (e.g. the CA) can provide information that the certificate(s) can still be trusted. In practice, this is often realized by using so-called Certificate Revocation Lists (CRL) on which revoked certificates are listed, or through an on-line protocol like Online Certificate Status Protocol (OCSP).

So, either the communicating parties 1002 may have copies of a CRL or can use OCSP (or both). Typically, the CA 1001 uses a server to run OCSP or to distribute CRLs.

Problems with the Prior Art not Realized to Date

A problem with CRLs resides in that they can grow large if the number of communicating points is large (like in the case of Machine-2-Machine (M2M) communication). In addition, the CRLs can become outdated and thus must be updated regularly.

OCSP allows the certificate status to be verified on-line. While then freshness of the status may be guaranteed, there arouses the risk of considerable cost in the increased signaling between the two parties and the OCSP server.

One way to find a compromise between those extremes may reside in short-lived certificates. Here, it may be decided beforehand how long an issued certificate is valid and when it is updated to a new certificate in due time before the active certificate expires. However, this implementation adds a new complexity of regularly distributing/re-issuing of certificates and the assumption of accurate (synchronized) clocks.

In the above scenarios, the traffic between the communicating parties and the TTP server should be reduced. In small wireless sensor devices, a bottleneck is the energy used for transmission. As an approach, it might be considered, inspired by caching techniques, to use caches to reduce the traffic that occurs in OCSP solutions. However, normal caching does not provide the security that is sought for when being used in a security protocol.

SUMMARY

Accordingly, there is a need for a technique that avoids one or more of the problems discussed above, or other problems. In particular, there is a need for not neglecting the security aspect.

In a first aspect, there is provided a method for providing a server entity, wherein the method is performed in a client and comprises the steps of providing the client with a secure trusted environment, the environment being trusted by the client and by at least one third party, and accommodating, in the secure trusted environment at least a local portion of the server entity, the server entity being configured to handle one or more server requests from the client, and data required by the server entity so as to handle the server request. In this way, both signaling load is alleviated and the security aspect is not neglected.

In a first refinement of the first aspect, the accommodating step preferably comprises caching the local portion of the server entity and the data. In addition or alternatively, the secure trusted environment preferably is a Trusted Execution Environment, TEE. In this way, both signaling load and security aspect is further improved; regarding time validity of locally cached functionality, data can be adapted to any rule that can be expressed by a program with corresponding configuration data as long as it can be fitted into the TEE.

In a second refinement of the first aspect, the local portion of the server entity preferably is a Local Trusted Third Party, LTTP. If so, the method preferably further comprises executing, by the local portion, a verification operation, the verification operation accepting as input argument a certificate to be verified. In the latter case, the input argument of verification operation preferably further comprises at least one of context information comprising additional information for the verification operation, at least one policy to be applied in the verification operation, and one of conditions or a state for a non-local portion of the server entity. If so, the at least one policy further preferably comprises a non-local policy and a local policy, and the method preferably further comprises at least one of controlling, by the local policy, length of time and usage of the data, invalidating, by the local policy, at least one of the context information and the non-local policy, enforcing, by the local policy, one of the server requests to be passed on to the non-local portion of the server entity, and supplying, by the local policy, rules for migration of the LTTP. In this manner, there is provided a more flexible way to handle the validity check by a TTP of data to be used in a security protocol in a way that reduces the data that needs to be transmitted to and from the TTP.

In a third refinement of the first aspect, the local portion of the server entity preferably is a Local Online Certificate Status Protocol, LOCSP. If so, the accommodating step preferably further comprises receiving, from a network, a bundle of the LOCSP and the data, the bundle being remotely installable code. In addition or alternatively, security in the secure trusted environment preferably is established by secure launching a remote virtual machine on the client. In this case, the secure launching of the remote virtual machine preferably utilizes at least one of a Trusted Computing Group, TCG, technology, and secure provisioning of applications into a Javacard. In addition or alternatively, the secure launching preferably further comprises first verifying that the secure trusted environment is trustworthy, and second verifying, by the secure trusted environment, that received server requests stem from the alleged origin. In the latter case, the second verifying step preferably uses digital signatures of the LOCSP. In this way, the LOCSP can operate as the OCSP for the client.

In a fourth refinement of the first aspect related to the LOCSP, the method preferably further comprises receiving, from a non-local portion of the server entity, information and a policy, and deciding, based on the received policy, whether the server requests are to be handled by the local portion or the non-local portion of the server entity. If so, the receiving step preferably is performed using a secure communication protocol. In this way, because of the machine-intelligence and capabilities of the LOCSP, the amount of information that needs to be exchanged by the OCSP and the LOCSP, can be kept small in most cases.

In a fifth refinement of the first aspect related to the fourth refinement, the information and policy is preferably embedded in a server request response sent from the non-local portion to the local portion of the server entity. In this case, the response is preferably tied to a nonce, the nonce being originally issued by the local portion of the server entity. In this way, caching is achieved and server functionality is split up to reduce communications costs; moreover, the behavioral policy data is thus protected against modifications and replay attacks.

In a sixth refinement of the first aspect related to the LOCSP, the client preferably is a virtual client, and the secure trusted environment is preferably comprised in another entity and is mutually trusted by both the client and by the LOCSP. If so, the LOCSP preferably is migratable to the mutually trusted secure trusted environment. In this way, the LOCSP is not coupled to its own secure trusted environment, but can be realized in any mutually trusted secure trusted environment.

In a second aspect, there is provided a method for enabling a client to provide a server entity, wherein the method is performed in a server and comprises the steps of providing, for a secure trusted environment of the client, the environment being trusted by the client and by at least one third party at least a local portion of the server entity, the server entity being configured to handle one or more server requests from the client, and data required by the server entity so as to handle the one or more server requests.

As a matter of course, the method of the second aspect can mirror any one of the first to sixth refinements of the first aspect insofar the server functionality is concerned.

In a third aspect, there is provided a computer program product comprising program code portions for performing the method of the first and/or second aspect(s) when the computer program product is executed on one or more computing devices. The computer program product may be stored on a computer readable recording medium such as a CD-ROM, DVD-ROM or semiconductor memory.

In a fourth aspect, there is provided a client for providing a server entity, wherein the client comprises at least one processor configured to provide the client with a secure trusted environment, the environment being trusted by the client and by at least one third party, and accommodate, in the secure trusted environment, at least a local portion of the server entity, the server entity being configured to handle one or more server requests from the client, and data required by the server entity so as to handle the server request.

In a fifth aspect, there is provided a server for enabling a client to provide a server entity, wherein the server is configured to provide, for a secure trusted environment of the client, the environment being trusted by the client and by at least one third party, at least a local portion of the server entity, the server entity being configured to handle one or more server requests from the client, and data required by the server entity so as to handle the one or more server requests.

The client and/or server according to the above fourth and fifth aspects may be configured to implement any one of the above method aspects.

BRIEF DESCRIPTION OF THE DRAWINGS

The embodiments of the technique presented herein are described herein below with reference to the accompanying drawings, in which.

DETAILED DESCRIPTION

In the following description, for purposes of explanation and not limitation, specific details are set forth (such as particular signaling steps) in order to provide a thorough understanding of the technique presented herein. It will be apparent to one skilled in the art that the present technique may be practised in other embodiments that depart from these specific details. For example, the embodiments will primarily be described in the context of a server entity used in verification; however, this does not rule out the use of the present technique in other systems and for other purposes (e.g., server entities for non-verification/authentication purposes).

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP) or general purpose computer. It will also be appreciated that while the following embodiments are primarily described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Figure 2:
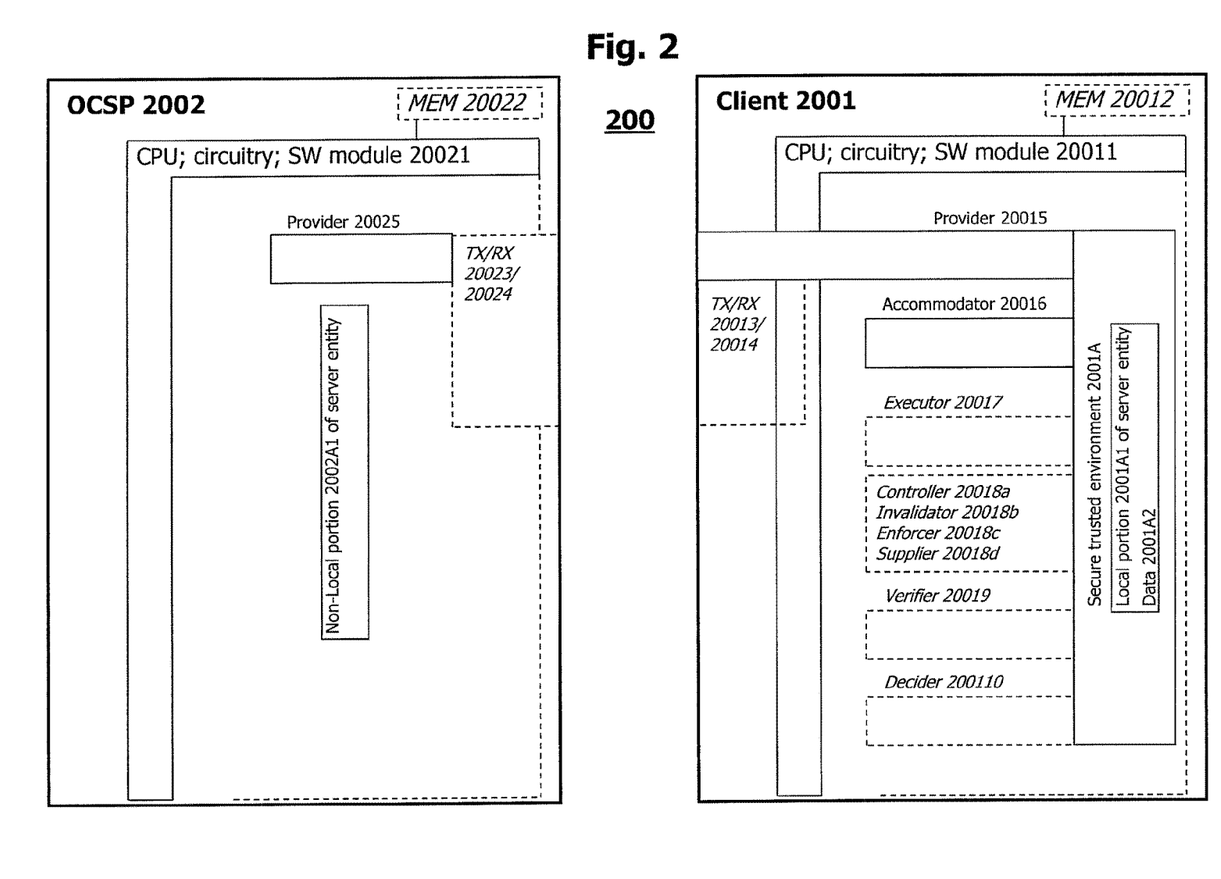
FIG. 2 shows components comprised in exemplary device embodiments realized in the form e.g. of a server and a client.

FIG. 2 shows components comprised in exemplary device embodiments realized in the form e.g. of a client 2001 and a server 2002 comprised in a network 200. As a non-limiting example, the server 2002 may be implemented in the form of an OCSP.

As shown in FIG. 2, the client 2001 comprises a core functionality (e.g., one or more of a Central Processing Unit (CPU), dedicated circuitry and/or a software module) 20011, an optional memory (and/or database) 20012, an optional transmitter 20013 and an optional receiver 20014. Moreover, the client 2001 comprises a provider 20015, an accommodator 20016, an optional executor 20017, an optional controller 20018a, an optional invalidator 20018b, an optional enforcer 20018c, an optional supplier 20018d, an optional verifier 20019 and an optional decider 200110. As shown by the prolonged box of the provider 20015, the provider 20015 may also utilize the transmitter 20013 and/or receiver 20014.

In turn, the server 2002 comprises a core functionality (e.g., one or more of a Central Processing Unit (CPU), dedicated circuitry and/or a software module) 20021, an optional memory (and/or database) 20022, an optional transmitter 20023 and an optional receiver 20024. Moreover, the server 2002 may comprise a provider 20025 (which may also be a duplicate version of the provider 20015 of the client 2001, or a shared entity). As shown by the prolonged box of the provider 20025, the provider 20025 may also utilize the transmitter 20023 and/or receiver 20024.

As partly indicated by the dashed extensions of the functional block of the CPUs 20011, 20021, the provider 20015, the accommodator 20016, the executor 20017, the controller 20018a, the invalidator 20018b, the enforcer 20018c, the supplier 20018d, the verifier 20019 and/or the decider 200110 (of the client 2001) as well as the provider 20025 (of the server 2002) may at least partially be functionalities running on the CPUs 20011, 20021, or may alternatively be separate functional entities or means controlled by the CPUs 20011, 20021 and supplying the same with information. For the client 2001 and the server 2002, the transmitter and receiver components (not shown) may be realized to comprise suitable interfaces and/or suitable signal generation and evaluation functions.

The CPUs 20011, 20021 may be configured, for example, using software residing in the memories 20012, 20022, to process various data inputs and to control the functions of the memories 20012, 20022, the transmitter 20013, 20023 and the receiver 20014, 20024 (as well the provider 20015, the accommodator 20016, the executor 20017, the controller 20018a, the invalidator 20018b, the enforcer 20018c, the supplier 20018d, the verifier 20019 and/or the decider 200110 (of the client 2001) as well as the provider 20025 (of the server 2002)).

The memories 20012, 20022 may serve for storing program code for carrying out the methods according to the aspects disclosed herein, when executed by the CPUs 20011, 20021. Additionally, or as an alternative, the memories 20012, 20022 are configured as a database.

It is to be noted that the transmitter 20013, 20023 and the receiver 20014, 20024 may be provided as an integral entity (as is shown in FIG. 2). It is further to be noted that the transmitter 20013, 20023 and the receiver 20014, 20024 may be implemented as physically separate entities (e.g., when disposed as stand-alone components), using routing/forwarding entities/interfaces between CPUs (e.g., when disposed as separate software on the same CPU), using functionalities for writing/reading information into/from a given memory area (e.g., when disposed as software code portions being no longer discernible) or as any suitable combination of the above. At least one of the above-described provider 20015, accommodator 20016, executor 20017, controller 20018a, invalidator 20018b, enforcer 20018c, supplier 20018d, verifier 20019 and/or decider 200110 (of the client 2001) as well as provider 20025 (of the server 2002), or the respective functionalities, may also be implemented as a chipset, module or subassembly.

Figure 3:
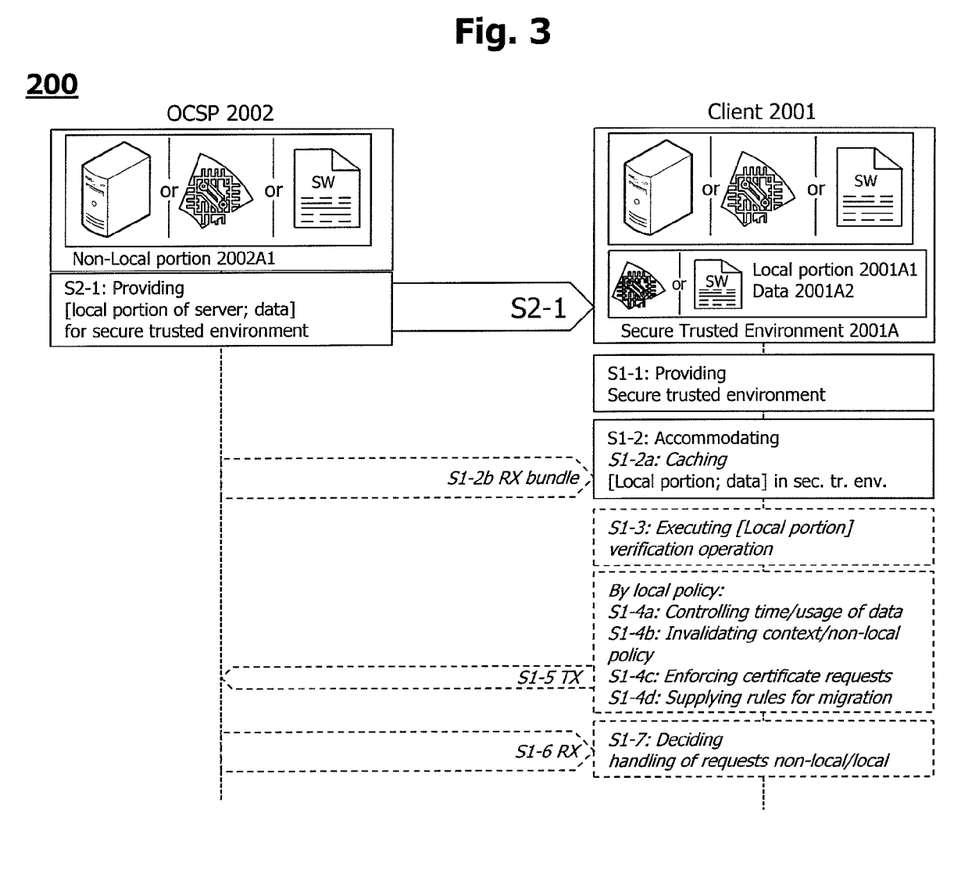
FIG. 3 shows method embodiments which also reflect the interaction between components of apparatus embodiments.

FIG. 3 illustrates method embodiments for enabling the client to provide a server entity. In the signaling diagram of FIG. 3, time aspects between signaling are reflected in the vertical arrangement of the signaling sequence as well as in the sequence numbers. It is to be noted that the time aspects indicated in FIG. 3 do not necessarily restrict any one of the method steps shown to the step sequence outlined in FIG. 3. This applies in particular to method steps that are functionally disjunctive with each other. For instance, receiving steps S2-1, S1-2b and S1-6 are shown to immediately precede the respective resulting steps S1-1, S1-2a and S1-7; however, this does not preclude that a period of time passes before the steps S1-1, S1-2a and S1-7 are performed after the respective reception steps.

Referring again to the signaling diagram of FIG. 3 (to be read along with the client 2001 and server 2002 illustrated in FIG. 2), in step S2-1, the provider 20025 of the server 2002 performs, for a secure trusted environment 2001A of the client 2001, the environment being trusted by the client 2001 and by at least one third party (not shown), at least a local portion 2001A1 of the server entity, the server entity being configured to handle one or more server requests from the client 2001, and data 2001A2 required by the server entity so as to handle the one or more server requests.

In response to step S2-1 (via receiver 20014) or on its own, in step S1-1, the provider 20015 of the client 2001 performs providing the client 2001 with the secure trusted environment 2001A. Further, in step S1-2, the accommodator 20016 of the client 2001 performs accommodating, in the secure trusted environment 2001A, at least the local portion 2001A1 of the server entity, the server entity being configured to handle one or more server requests from the client 2001, and the data 2001A2 required by the server entity so as to handle the server request.

The memory 20012 of the client 2001 may take the form of a cache; however, this does not rule out the possibility it is also installed directly with the CPU 20011 (e.g. as an on-board or on-chip cache). In an optional step S1-2b, the server 2002 may transmit bundled code, and in an optional step S1-2a, the cache performs caching the local portion 2001A1 of the server entity and the data 2001A2 (based on the received bundled code).

As a development, the secure trusted environment 2001A may take the form of a Trusted Execution Environment, TEE; likewise, the local portion 2001A1 of the server entity may be a Local Trusted Third Party, LTTP.

Hereinbelow, another embodiment of the invention for certificate validation checking will be discussed. However, as a non-limiting example, the present embodiment is concerned with credentials for access control, where the TIP (not shown) guards over the validity of (data) objects (or of the objects themselves).

Still further, in an optional step S1-3, the executor 20017 of the client 2001 performs executing, by the local portion 2001A1, a verification operation, the verification operation accepting as input argument a certificate to be verified. If so, the input argument of verification operation may further comprise at least one of context information comprising additional information for the verification operation, at least one policy to be applied in the verification operation, and one of conditions or a state for a non-local portion 2002A1 of the server entity installed on the server 2002.

In other words, the verification operation executed in the TTP 2002A1 can be expressed by the function:

Verify (obj, obj_context, policy, conds), where 'obj' represents the object to be verified, 'obj_context' represents the optional additional info/data in the verification process, 'policy' represents the policies to be applied in the verification, and 'conds' represents the conditions or state (e.g. time) of the TTP 2002A1 for verification.

In an extreme case, the function could collapse to:

Verify (obj), in case the other dependencies are not used or are not needed.

In other words, the LTTP 2001A1 is preferably created to be executed in the client TEE 2001A and provide the TEE 2001A with the function Verify and the policy, as described above. As long as the policy and context do not change, or are allowed to be used, the LTTP 2001A1 is preferably trusted to apply its own cond(ition)s to compute 'Verify' correctly.

In addition, in the LTTP 2001A1, the computation of 'Verify' does not necessarily have to be a copy of the 'Verify' executed by the TTP 2002A1. Under favorable conditions, partial results of the 'Verify' computation can be cached or simplified, under the prerequisite that they—on the client 2001—produce substantially the same value. Thus, reducing of computational efforts can be achieved.

As a non-limiting example, the at least one policy further comprises a non-local policy and a local policy. In that case, one or more of the following applies: in an optional step S1-4a, the controller 20018a of the client 2001 performs controlling, by the local policy, length of time and usage of the data; in an optional step S1-4b, the invalidator 20018b of the client 2001 performs invalidating, by the local policy, at least one of the context information and the non-local policy; in an optional step S1-4c, the enforcer 20018c of the client 2001 performs enforcing, by the local policy, one of the server requests to be passed on to the non-local portion of the server entity; and in an optional step S1-4d, the supplier 20018d of the client 2001 performs supplying, by the local policy, rules for migration of the LTTP.

In other words, length of time and purpose of the cached data can be controlled by an additional policy referred to as 'local_policy'. The local policy can locally invalidate the cached 'obj_context' and/or policy data. It also could enforce that certain requests for verification always must be passed to the actual TTP 2002A1. It can also contain rules for possible migration of the LTTP 2001A1.

In the following, certificate validity checking will be described. Under certain circumstances, the use of OCSP and a method of tight CRL distribution become closely related when it comes to the risk of wrongly accepting revoked certificates. In the following, the online OCSP approach is described; however, this does not preclude that the technique according the present invention can also be used in connection with CRL distribution. For simplicity, it can be assumed that the CA operates the OCSP server 2002, but other (business/organizational) setups can exist.

As a non-limiting example, the local portion 2001A1 of the server entity preferably is a Local Online Certificate Status Protocol, LOCSP. If so, in the optional step S1-2b (described above), the accommodator 20016 of the client 2001 performs receiving, from a network, a bundle of the LOCSP and the data, the bundle being remotely installable code.

To sum up, from the OCSP server 2002, at least a part is extracted that can check a certificate and equip the client 2001 with a data cache/storage 20012 for that data it needs to handle the server request of the client 2001. This server part and storage may be bundled into a remote installable (possibly migratable) code referred to as a LOCSP 2001A1 that can execute in a TEE 2001A of the client 2001. Besides said functionality, the LOCSP 2001A1 may be equipped with new additional functions that for use in the client 2001.

As a further non-limiting example, security in the secure trusted environment preferably is established by secure launching a remote virtual machine on the client.

In that case, the secure launching of the remote virtual machine may utilize at least one of a Trusted Computing Group™, TCG, technology, and secure provisioning of applications into a Javacard.

Figure 3A:
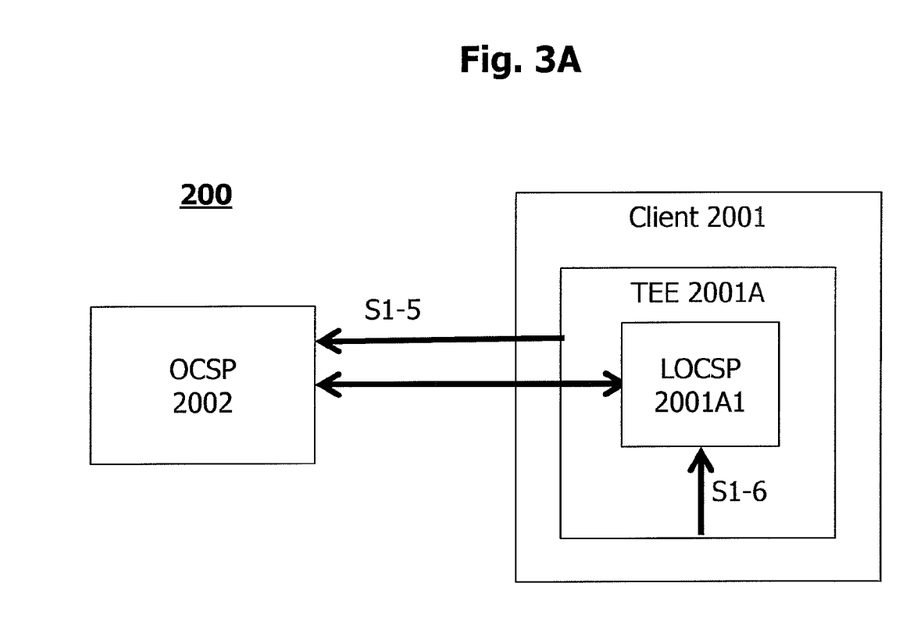
FIG. 3A shows a detailed first method example in relation to the method embodiments.

FIG. 3A shows a detailed first method example in relation to the method embodiments. Namely, an in optional step S1-5, the verifier 20019 of the client 2001 may perform verifying that the secure trusted environment is trustworthy, and may perform, in an optional step S1-6, verifying, by the secure trusted environment, that received server requests stem from the alleged origin. If so, the latter verifying step S1-6 may use digital signatures of the LOCSP 2001A1.

In other words, two steps can be used: a) the secure launch involves a verification that the TEE 2001A can be trusted, and b) the TEE 2001A verifies that the code and data it receives comes from the claimed origin (e.g. by using digital signatures of the LOCSP code/data).

Figure 3B:
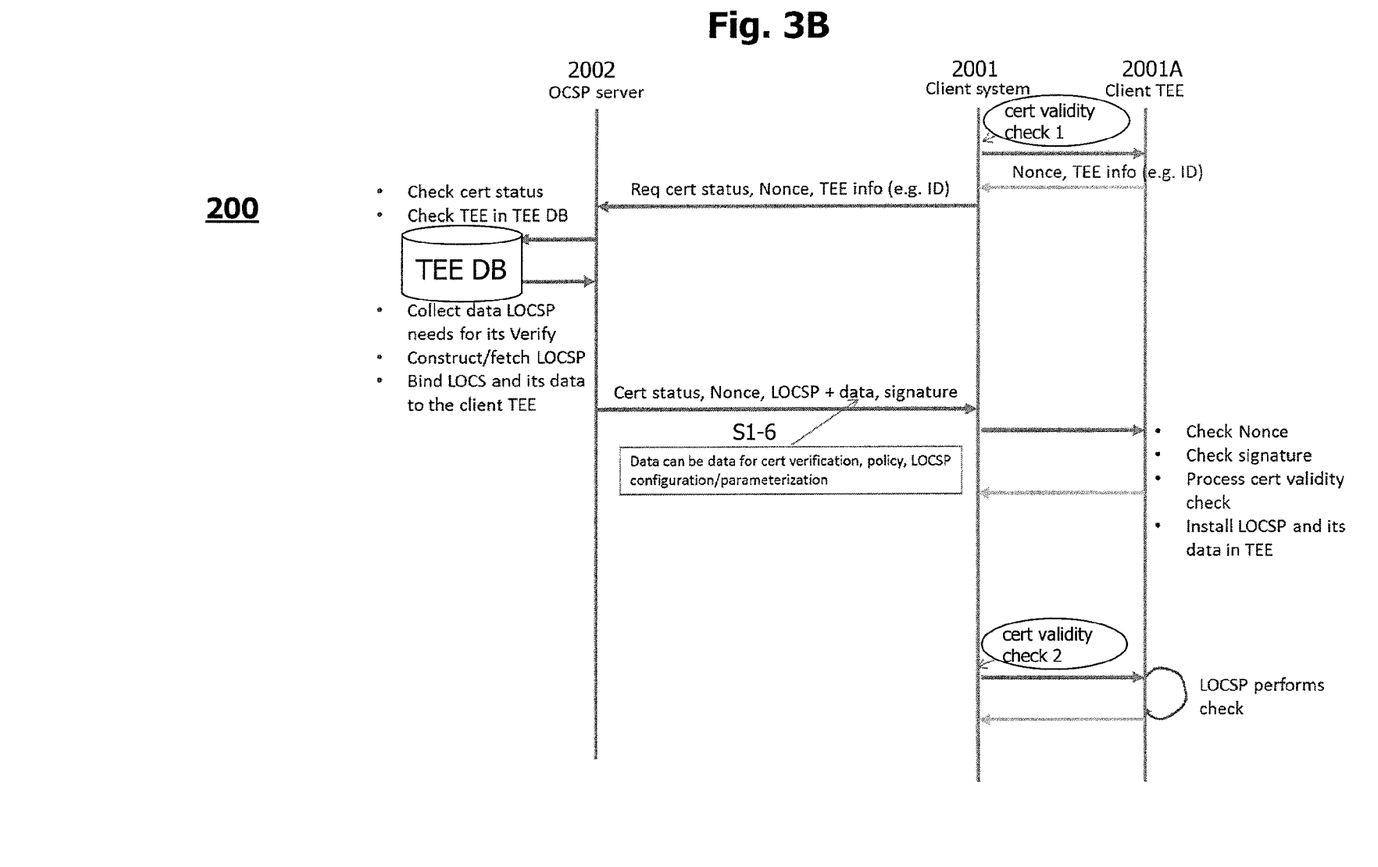
FIG. 3B shows a detailed second method example in relation to the method embodiments.

FIG. 3B shows a detailed second method example in relation to the method embodiments.

Namely, in an optional step S1-6, the receiver 20014 of the client 2001 may perform receiving, from the non-local portion 2002A1 of the server entity, information and a policy. Further, in an optional step S1-7, the decider 200110 performs deciding, based on the received policy, whether the server requests are to be handled by the local portion 2001A1 or the non-local portion 2002A1 of the server entity. If so, the receiving step S1-6 may be performed using a secure communication protocol.

In other words, with the functionality described above and the data, the LOCSP 2001A1 can operate as the OCSP for the client 2001. However, in order to check the certificate status again with the actual OCSP 2002A1, for the LOCSP 2001A1 executed in a trusted environment 2001A, the "real" OCSP 2002A1 can endow the LOCSP 2001A1 with knowledge and behavioral policies that the LOCSP 2001A1 can use to decide when local certificate status request can be handled by cached information that the LOCSP 2001A1 has available or it has to contact the "real" OCSP 2002A1.

Figure 3C:
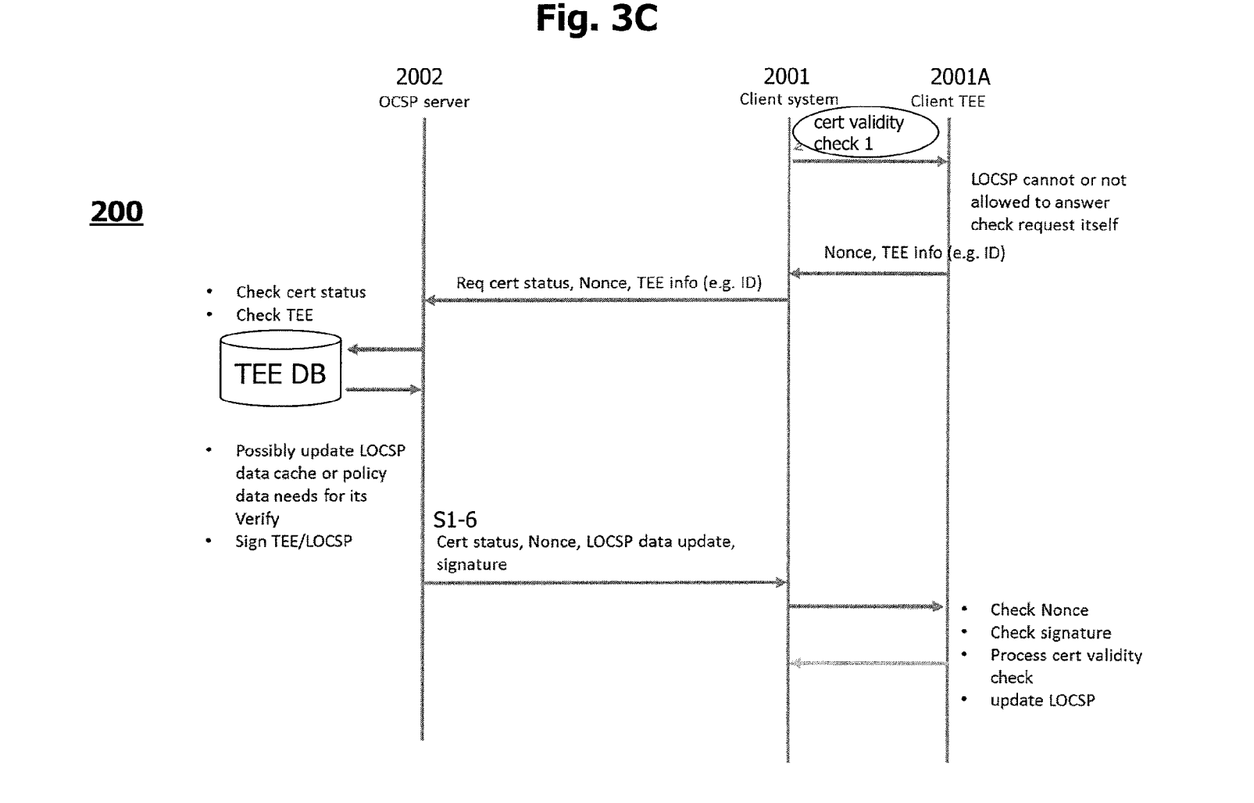
FIG. 3C shows a detailed third method example in relation to the method embodiments.

FIG. 3C shows a detailed third method example in relation to the method embodiments.

In addition to the functionality described in FIG. 3B, the information and policy may be embedded in a server request response sent from the non-local portion 2002A1 to the local portion 2001A1 of the server entity. In that case, the response may be tied to a nonce, the nonce being originally issued by the local portion 2001A1 of the server entity.

In other words, communication between the OCSP 2002A1 and the LOCSP 2001A1 can be protected on the basis of shared credentials and using a secure communication protocol, e.g. DTLS. Because of the machine-intelligence and capabilities of the LOCSP 2001A1, the LOCSP 2002A1 can be kept small most cases.

Finally, as a last non-limiting example, the client preferably is a virtual client, and the secure trusted environment 2001A is preferably comprised in another entity and is mutually trusted by both the client 2001 and by the LOCSP 2001A2. If so, the LOCSP 2001A1 may be migratable to the mutually trusted secure trusted environment.

In other words, in the case of a virtual client, there may arouse a case in which the location of the LOCSP 2001A1 is not directly coupled to its TEE 2001A but can be realized in any TEE which the client 2001 and the OCSP 2002 can trust together. In such a setting, it is advantageous for the LOCSP 2001A1 to be migratable among any mutually trusted TEE.

Without being restricted thereto, the basic idea of the present invention can be summarized is to use the capability of modern clients 2001 (devices) to be equipped with a Trusted Execution Environment (TEE) 2001A (e.g. based on ARM TrustZone or virtualization technologies) that not only is trusted by the user of the client 2001 but also by a third party in a way that exports at least a part of the TTP functions into the client 2001. This allows performing the TTP operations locally in the client 2001 and reducing communications (e.g. in terms of size and or instances). Using virtualization techniques and migration of virtual machines, the TTP functions can actually migrate among trusted infrastructure nodes in a way that is optimal for the TTP task to be performed.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method, performed in a client, for providing a server entity, the method comprising:
   providing the client with a secure trusted environment in the client, wherein the secure trusted environment is trusted by the client and by at least one third party;
   accommodating, in the secure trusted environment:
      at least a local portion of the server entity, wherein the local portion is cached and is a Local Online Certificate Status Protocol (LOCSP), and the server entity is configured to handle one or more server requests from the client; and
      data required by the server entity so as to handle the one or more server requests from the client, wherein the one or more server requests comprise a nonce issued by the local portion of the server entity; and
   secure launching a remote virtual machine on the client for establishment of security in the secure trusted environment, the secure launching comprising:
      first verifying that the secure trusted environment is trustworthy; and
      second verifying, by the secure trusted environment, which of the one or more server requests received from the server entity stem from the client using digital signatures of the LOCSP.

2. The method of claim 1, wherein the accommodating comprises caching the local portion of the server entity and the data.

3. The method of claim 1, wherein the secure trusted environment is a Trusted Execution Environment.

4. The method of claim 1, wherein the local portion of the server entity is a Local Trusted Third Party (LTTP).

5. The method of claim 4, further comprising executing, by the local portion, a verification operation, the verification operation accepting as input argument a certificate to be verified.

6. The method of claim 5, wherein the input argument of the verification operation further comprises at least one of:
   context information comprising additional information for the verification operation;
   at least one policy to be applied in the verification operation; and
   one or more conditions and a state for a non-local portion of the server entity.

7. The method of claim 6:
   wherein the at least one policy comprises a non-local policy and a local policy;
   further comprising at least one of:
      controlling, by the local policy, length of time and usage of the data;
      invalidating, by the local policy, at least one of the context information and the non-local policy;
      enforcing, by the local policy, one of the one or more server requests to be passed on to the non-local portion of the server entity; and
   supplying, by the local policy, rules for migration of the LTTP.

8. The method of claim 1, wherein the accommodating comprises receiving, from a network, a bundle of the LOCSP and the data, the bundle being remotely installable code.

9. The method of claim 1, further comprising:
   receiving, from a non-local portion of the server entity, information and a policy; and
   deciding, based on the received policy, whether the one or more server requests are to be handled by the local portion or the non-local portion of the server entity.

10. The method of claim 9, wherein the receiving is performed using a secure communication protocol.

11. The method of claim 9, wherein the information and the policy are embedded in a server request response sent from the non-local portion to the local portion of the server entity.

12. The method of claim 11, wherein the server request response is tied to a nonce, the nonce being originally issued by the local portion of the server entity.

13. The method of claim 1, wherein:
   the client is a virtual client;
   the secure trusted environment is comprised in another entity and is mutually trusted by both the client and by the LOCSP.

14. The method of claim 13, wherein the LOCSP is migratable to the mutually trusted secure trusted environment.

15. A computer program product stored in a non-transitory computer readable medium for providing a server entity, the computer program product comprising software instructions which, when run on one or more processors of a client, causes the client to:
   provide the client with a secure trusted environment in the client, wherein the secure trusted environment is trusted by the client and by at least one third party;
   accommodate, in the secure trusted environment:
      at least a local portion of the server entity, wherein the local portion is cached and is a Local Online Certificate Status Protocol (LOCSP), and the server entity is configured to handle one or more server requests from the client; and
      data required by the server entity so as to handle the one or more server requests from the client, wherein the one or more server requests comprise a nonce issued by the local portion of the server entity; and
   secure launch a remote virtual machine on the client for establishment of security in the secure trusted environment, the secure launch comprising:
      first verification that the secure trusted environment is trustworthy; and second verification, by the secure trusted environment, which of the one or more server requests received from the server entity stem from the client using digital signatures of the LOCSP.

16. A client for providing a server entity, the client comprising:
at least one processing circuit configured to:
provide the client with a secure trusted environment in the client, wherein the secure trusted environment is trusted by the client and by at least one third party;
accommodate, in the secure trusted environment:
at least a local portion of the server entity, wherein the local portion is cached and is a Local Online Certificate Status Protocol (LOCSP), and the server entity is configured to handle one or more server requests from the client; and
data required by the server entity so as to handle the one or more server requests from the client, wherein the one or more server requests comprise a nonce issued by the local portion of the server entity; and
secure launch a remote virtual machine on the client for establishment of security in the secure trusted environment, the secure launch comprising:
first verification that the secure trusted environment is trustworthy; and
second verification, by the secure trusted environment, which of the one or more server requests received from the server entity stem from the client using digital signatures of the LOCSP.

* * * * *